United States Patent [19]

Bruengger

[11] Patent Number: 4,571,788
[45] Date of Patent: Feb. 25, 1986

[54] DOUBLE ACTION PRESSURE RELEASE

[75] Inventor: Craig V. Bruengger, Scituate, Mass.

[73] Assignee: Hazeltine Corporation, Commack, N.Y.

[21] Appl. No.: 553,892

[22] Filed: Nov. 21, 1983

[51] Int. Cl.[4] .............................................. A44B 11/25
[52] U.S. Cl. ........................................ 24/602; 24/651;
24/652; 367/4; 403/316; 403/322; 441/10; 441/33
[58] Field of Search ................ 24/602, 603, 652, 653, 24/651, 656, 658, 662, 663, 573, 665, 671, 672, 677, DIG. 26; 73/170 A, 300; 367/4; 102/406, 413, 414; 403/16, 32, 316, 322, 329; 441/2, 7, 10, 33

[56] References Cited

U.S. PATENT DOCUMENTS

| | | | |
|---|---|---|---|
| 1,294,327 | 2/1919 | Boston et al. ................... | 102/414 X |
| 2,824,315 | 2/1958 | McKenny ........................ | 24/603 X |
| 3,704,633 | 12/1972 | Iverson ............................ | 24/602 |
| 3,944,964 | 3/1976 | Loeser et al. .................... | 367/4 |
| 3,947,152 | 3/1976 | Ross et al. ...................... | 403/329 X |
| 4,074,271 | 2/1978 | Sakuma ........................... | 403/322 X |
| 4,301,734 | 11/1981 | Peregrim et al. ................ | 102/413 |
| 4,313,381 | 2/1982 | Tolliver et al. ................. | 102/414 X |
| 4,369,709 | 1/1983 | Backstein et al. ............... | 102/414 X |
| 4,453,449 | 6/1984 | Hollmann ....................... | 403/322 X |

FOREIGN PATENT DOCUMENTS

| | | | |
|---|---|---|---|
| 2132128 | 1/1972 | Fed. Rep. of Germany .......... | 367/4 |
| 577726 | 5/1946 | United Kingdom ................. | 24/602 |
| 907001 | 9/1962 | United Kingdom ................. | 24/602 |

*Primary Examiner*—William E. Lyddane
*Assistant Examiner*—James R. Brittain
*Attorney, Agent, or Firm*—E. A. Onders; F. R. Agovino

[57] ABSTRACT

An apparatus for use in a fluid medium which activates at a deeper depth and then releases at a lesser depth. A rod depresses a spring in a housing. The rod is prevented from being ejected from the housing by a ball bearing which engages between openings in the rod and the housing. When in use, the pressure exerted by the fluid medium forces the rod deeper into the housing. When the first depth is reached the ball bearing disengages from the rod and the device is activated. As the activated apparatus rises, the pressure on the rod decreases and the rod moves out of the housing. When the deployment depth is attained the housing floods and the rod is ejected.

2 Claims, 11 Drawing Figures

DOUBLE ACTION PRESSURE RELEASE

The Government has rights in this invention pursuant to Contract No. N62259-81-C-0389 awarded by the Department of the Navy.

BACKGROUND OF THE INVENTION

1. Field of the Invention

The invention relates generally to an apparatus to be used in any fluid medium for responding to an increasing and then decreasing pressure and, in particular, for assisting in the deployment of a horizontal acoustic line array in the medium.

2. Description of the Prior Art

Sonobuoys are well known in the prior art. For example, U.S. Pat. No. 4,189,786 describes a radio buoy assembly including an intelligence capsule. Such sonobuoys have been generally configured to deploy vertical acoustic line arrays of sensors for monitoring. Recently, a need for sonobuoys which deploy horizontally spaced arrays of hydrophones, such as that disclosed in U.S. Pat. No. 4,254,480, has developed. Horizontal line arrays are deployed vertically in the ocean and then horizontally positioned by the drag force on the array due to water currents. A float at the end of the line array aids in the positioning. A weighted element at the forward end of the line array provides a pivot point about which the array rotates at the desird depth. The line array is neutrally buoyant and has a sea chute at its end for stabilizing its horizontal position.

In practice, the line array positions itself horizontally very slowly. This is a major drawback in the use of horizontal line arrays. A sea chute will further impede the attainment of the horizontal position of the line array because it resists the motion of the line array through the ocean. Therefore, it is desirable to keep the sea chute collapsed until the horizontal position is reached. The float, on the other hand, needs to be discarded when the horizontal position is reached or the line array will continue to rise.

A simple, inexpensive method is needed to perform these dual functions. A single action pressure release cannot deploy the chute and release the float because the apparatus would release during the vertical deployment cycle when the apparatus first passes the pressure at which horizontal stability occurs. Because of this, the release of the float and the deployment of the sea chute had to be done with a double action device connected to a containment bag which held the sea chute and the float.

SUMMARY OF THE INVENTION

It is an object of this invention to provide an apparatus for use in a fluid medium which is activated at a first depth due to a first pressure of the medium at the first depth and then is released at a second depth due to a second pressure at this second depth, the second pressure being less than the first pressure.

It is another object of this invention to provide an apparatus which responds first to an increasing pressure, activating at a first depth corresponding to the pressure at the bottom end of a line array when the array is vertically deployed and then responds to a decreasing pressure, releasing when the second pressure corresponding to the depth of horizontal stability is reached, the first depth being greater than the second depth.

It is another object of this invention to provide an apparatus for releasing a float and deploying a sea chute on a horizontal line array after the array has been vertically deployed to a first depth, and then has been horizontally stabilized at a second depth, which is less than the first depth.

The apparatus comprises a housing with a chamber and a member located in the chamber. There are means for preventing the member from being ejected from the chamber until the second desired pressure is reached.

For a better understanding of the present invention, together with other objects, reference is made to the following description, taken in conjunction with the accompanying drawings, and its scope will be pointed out in the appended claims.

DETAILED DESCRIPTION OF THE INVENTION

The double action pressure release according to the invention responds to an increasing and then decreasing pressure experienced at the depths of the fluid medium within which it is located.

Figure 1:
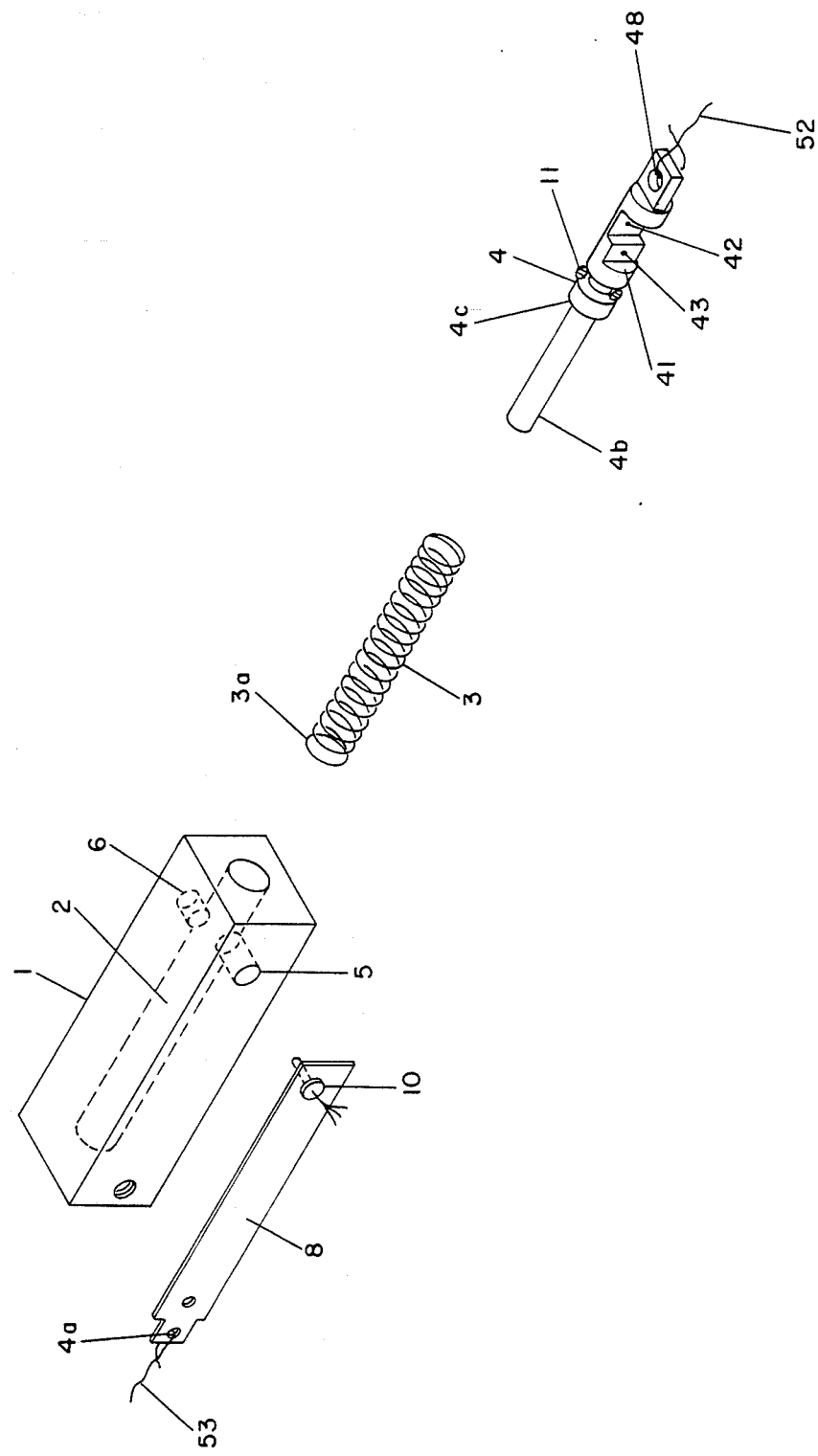
FIG. 1 is a perspective assembly view of an apparatus according to the invention, in disassembled condition.

Referring to FIG. 1, a preferred embodiment comprises rectangular housing 1, with cylindrical chamber 2. Compression spring 3 is located in the chamber with end 3a in contact with the bottom of the chamber 2 and the other end in contact with a cylindrical rod 4.

Rod 4 is divided into upper end 4a, and lower end of lesser diameter 4b. Spring 3 surrounds end 4b, in contact with rod 4 at shoulder 4c.

Figure 4:
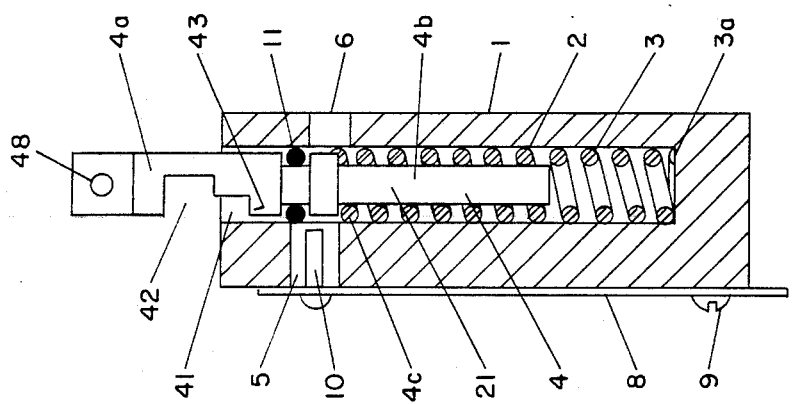
FIGS. 2–4 are longitudinal cross sectional diagrams of the apparatus of FIG. 1 in the assembled, activated and released positions, respectively.
Figure 3:
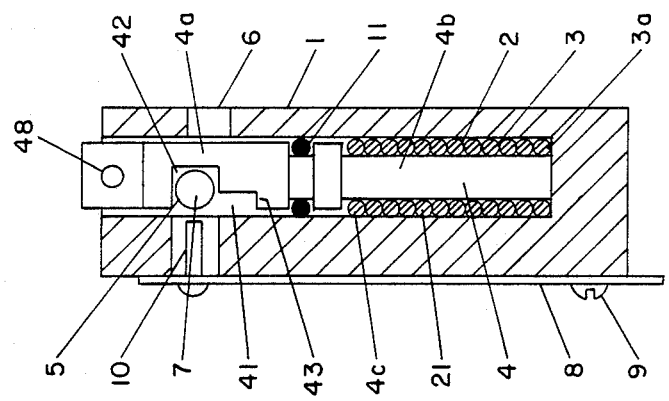
Figure 2:
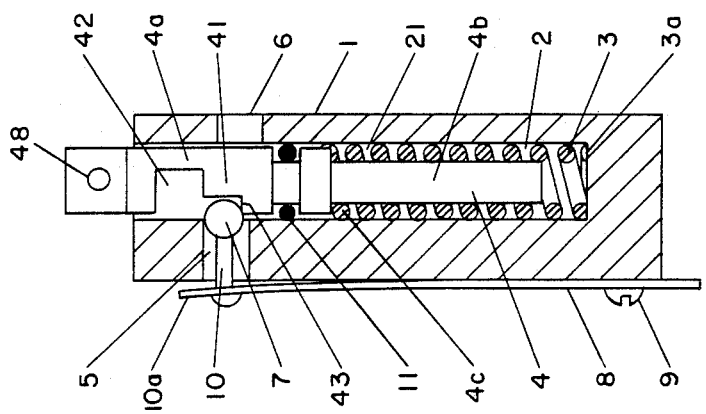

As shown in FIGS. 2–4, housing 1 has two offset holes 5 and 6 on opposite sides.

Rod 4 has two notches, 41 and 42, with notch 42 closer to the top of rod 4. Notch 42 has a greater depth than notch 41. Notches 41 and 42 are on the same side of rod 4 so that each notch is associated with hole 5.

When assembled, FIG. 2, rod 4 is in chamber 2 with notch 41 in registration with hole 5. Ball bearing 7 with a diameter less than the depth of notch 42 but greater than the depth at notch 41 is located in opening 5 and projects into notch 41, as shown in FIGS. 2 and 3. Rod 4 is prevented from exiting the chamber because ball bearing 7 is held in place by rivet 10, between opening 5 and side 43 of notch 41.

Leaf spring 8 is held in place by screw 9, which engages the bottom of housing 1 on the same side as opening 5. End 10a of leaf spring 8 has rivet 10 which extends into opening 5, pushing ball bearing 7 toward the rod. O-ring 11 is placed around rod 4, below notches 41 and 42, creating a water-tight, pressure seal between lower section 4b of rod 4 and chamber 2, forming a water tight section 21.

Figure 5:
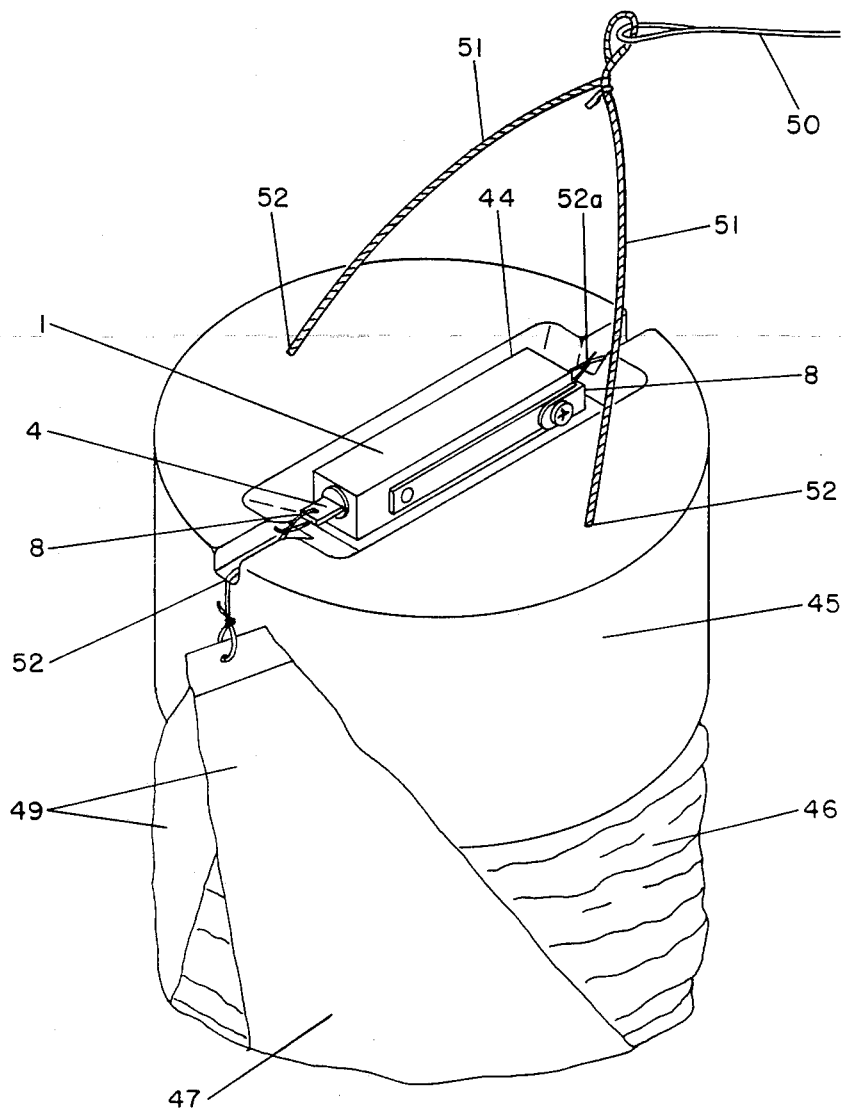
FIG. 5 shows the double action pressure release in position before the sea chute and float are released.

As shown in FIG. 5, the apparatus sits in cavity 44 in polyethylene cup 45. Sea chute 46 is kept folded by containment bag 47 with flaps 49. Flaps 49 are tied to hole 48 at the end of rod 4 which extends out of chamber 2 and hole 4a at the bottom of leaf spring 8, as shown in FIG. 1 and FIG. 5, by cords 52 and 52a.

Figure 6:
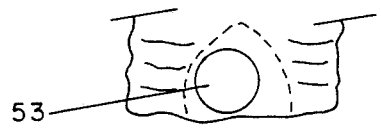
FIG. 6 is a partial cross sectional diagram of the containment bag, showing the float.

Float 53 is also held by containment bag 47, as shown in FIG. 6.

OPERATION OF THE INVENTION

Figure 8:
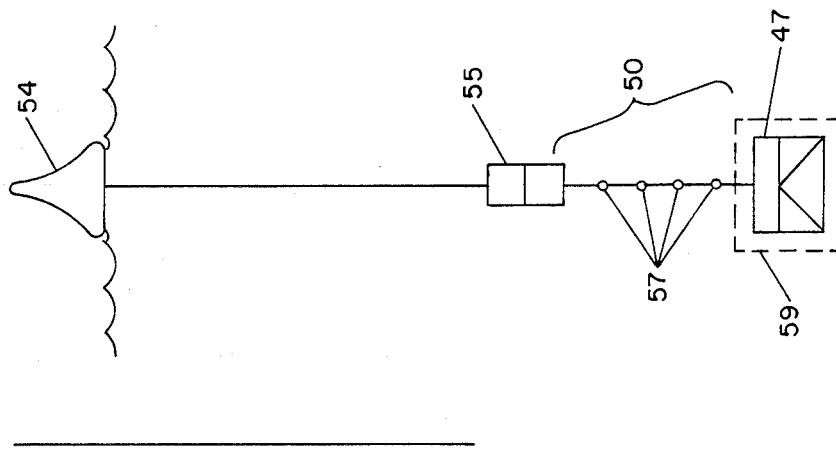
Figure 7:
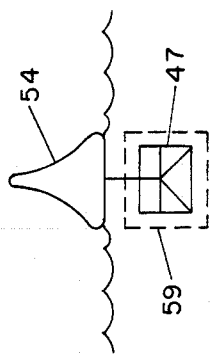

FIGS. 7-10 show several stages in the deployment of the horizontal line array 50 from surface float 54. The entire system is stored in housing 59, as shown in FIG. 7. Housing 59 sinks due to its weight and float 54 remains on the surface, as shown in FIG. 8. As housing 59 sinks, line array 50 is pulled out and deployed. Housing 59 falls off when line array 50 is fully deployed vertically, releasing containment bag 47.

Acoustic elements 57 are located on line array 50, below electronics package 55. Cable 60 is an electrical signal cable, called an uplink cable, which carries electrical signals from electronics package 55 to the surface. Electronics package 55 acts as an anchor about which line array 50 pivots as shown by arrow 61 in FIG. 9. Water currents and float 53 cause line array 50, which is neutrally buoyant, to rotate toward the horizontal position.

While the apparatus descends in the fluid medium during deployment the pressure on rod 4 increases, forcing rod 4 deeper into chamber 2, FIGS. 2-4. When line array 50 is deployed vertically, the first desired depth is reached. At this location the pressure exerted by the fluid medium forces rod 4 far enough into chamber 2 such that opening 42 is in registry with hole 5, activating the device, FIG. 3. Ball bearing 7 is pushed completely into opening 42 by leaf spring 8. Rivet 10 prevents the entry of ball bearing 7 back into opening 5. Rod 4 is now free to move controlled only by the force exerted by spring 3, pressure exerted by the fluid medium and the pull of flaps 49 of containment bag 47 via cords 52 and 52a.

Figure 9:
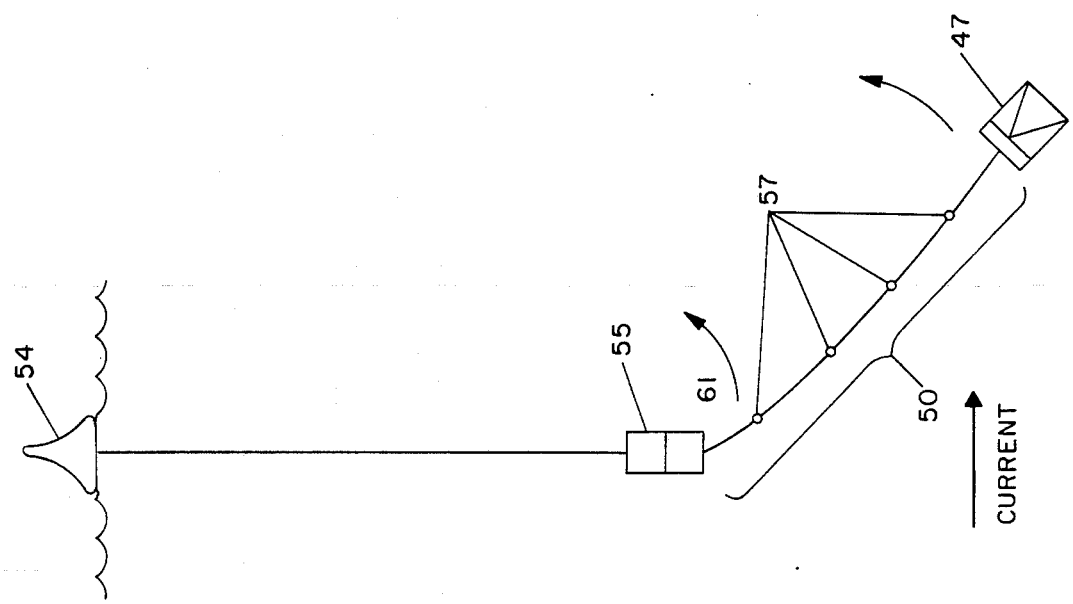
FIGS. 7–10 illustrate the various stages in the deployment of the horizontal line array.
Figure 10:
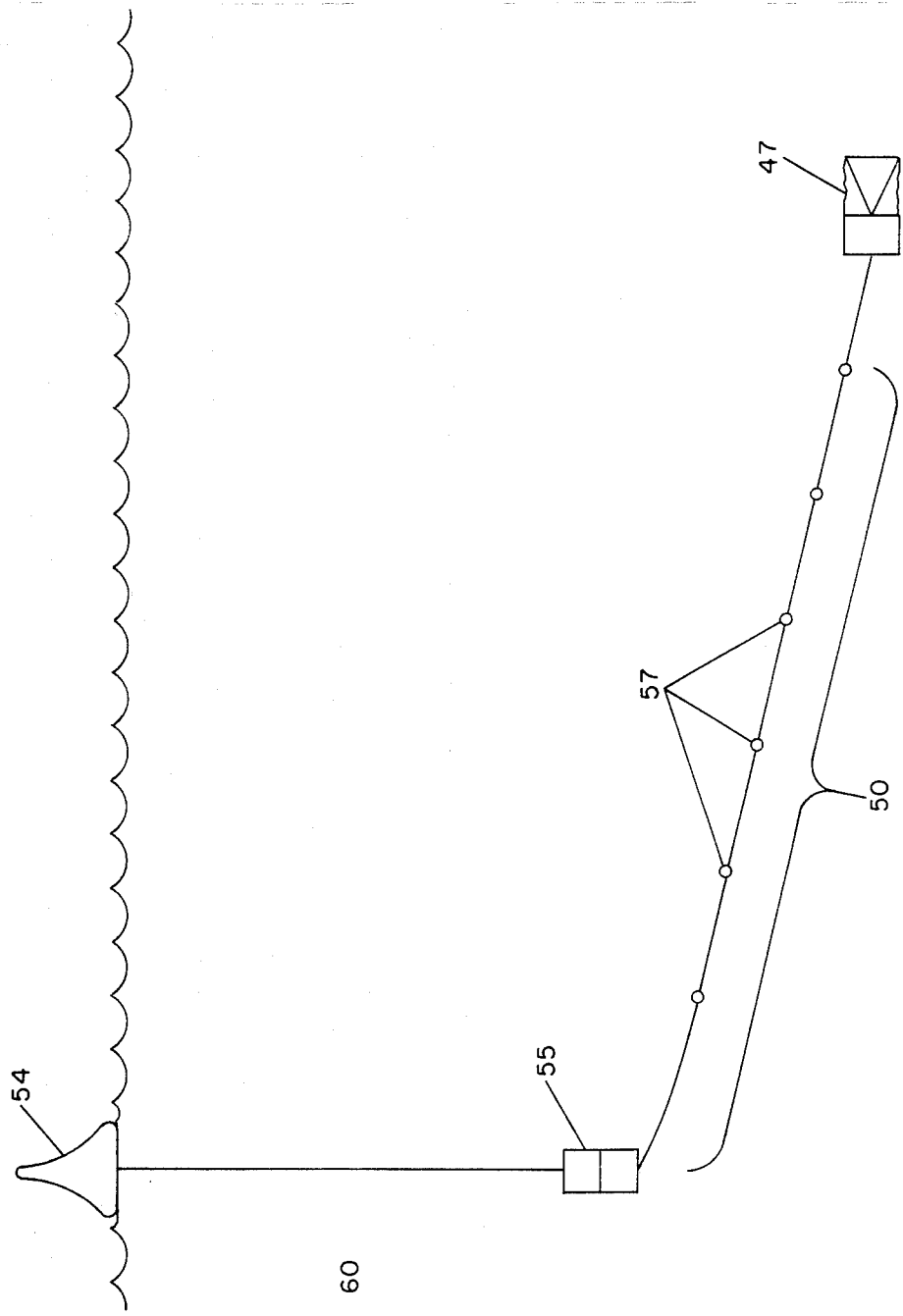
Figure 11:
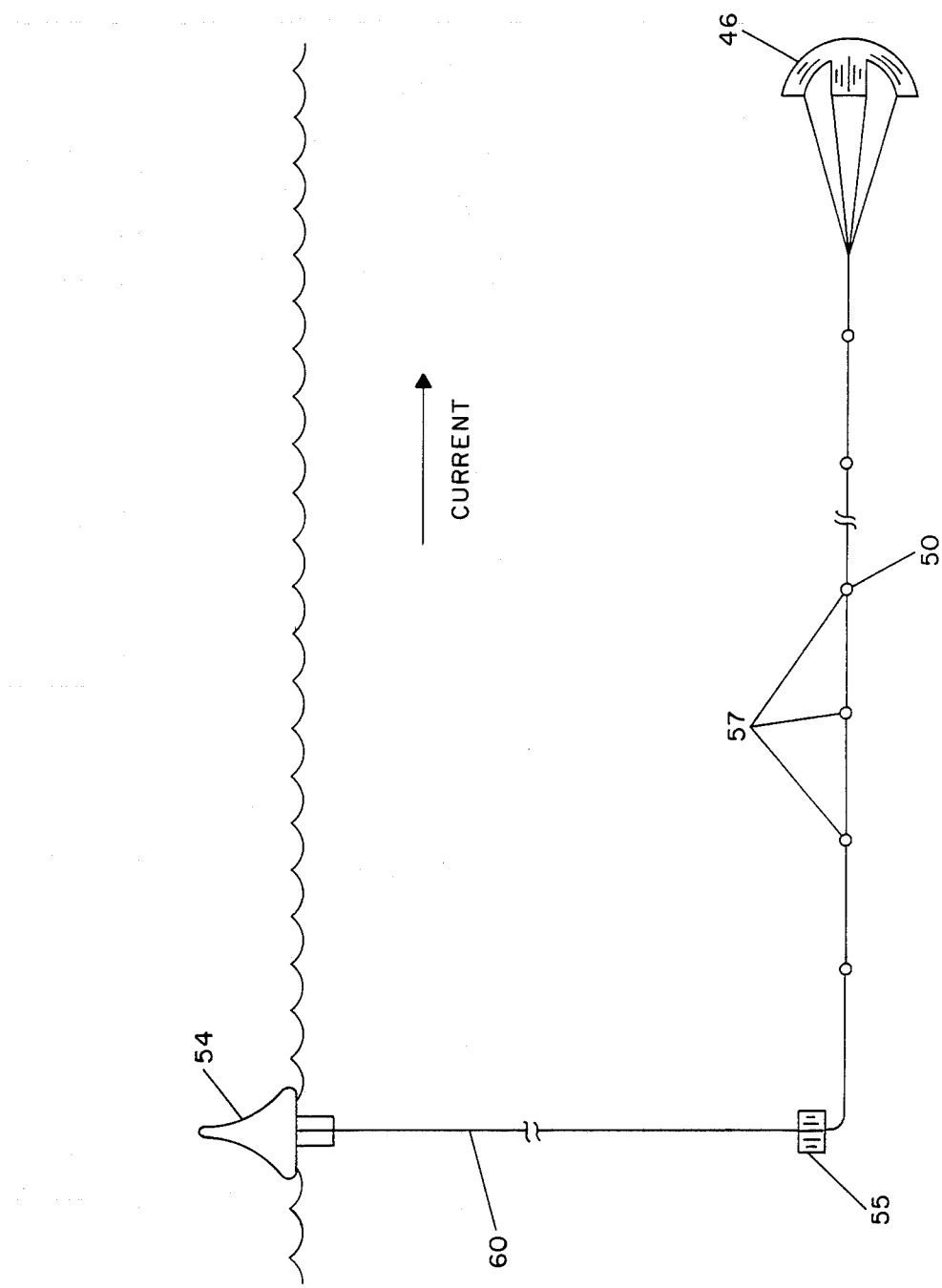
FIG. 11 shows the final configuration of the horizontal line array with its sea chute deployed.

The apparatus rises as line array 50 rights itself, as shown in FIGS. 9 and 10. As a result, the fluid pressure on rod 4 decreases and rod 4 is forced to move farther out of the chamber by spring 3.

The second desired depth is reached when the horizontal position is attained. The pressure exerted at this depth by the fluid medium is such that rod 4 moves far enough out of chamber 2 so that O-ring 11 rises above hole 6. Fluid enters the lower watertight chamber 21, equalizing the pressure exerted by the fluid medium. Rod 4 is then expelled from chamber 2 by the force of spring 3, thereby releasing the apparatus. Flaps 49 are released, sea chute 46 is deployed and float 53 is allowed to rise to the surface. The apparatus, rod 4 and bag 47 sink.

The spring constant of spring 3, the location of O-ring 11, the location of holes 5 and 6 or the size and location of notches 41 and 42 can all be varied to determine the depth where the apparatus will be activated and the depth where the apparatus will release.

The apparatus will not activate unless it descends to the first desired pressure. If the apparatus goes below the first desired pressure, it will still activate and then release when line array 50 reaches its horizontal position.

While the pressure release according to the invention has been described with regard to the deployment of horizontal line arrays in the ocean, the device can be used in any type of fluid medium for any purpose when a response to an increasing and then decreasing pressure is needed.

What is claimed is:

1. A pressure responsive apparatus for use in a fluid medium, said apparatus comprising:
    (a) a housing with a chamber, said chamber open at one end and closed at the other end;
    (b) a first member located in the chamber;
    (c) sealing means between said member and said housing for defining a sealed portion of the chamber;
    (d) retainer means supported by the housing and engaging the first member for preventing the first member from moving out of the chamber while allowing the first member to move further into the chamber, said retainer means permitting disengagement of the first member from the housing when the apparatus reaches a first depth in the fluid medium;
    (e) ejecting means for ejecting the first member when the apparatus reaches a second depth in the fluid medium, said ejecting means including first means associated with said chamber for equalizing the fluid pressure in the sealed chamber when the apparatus reaches the second depth and resilient means between one end of said member and one end of the chamber for forcing the first member out of the chamber when the fluid pressure in the sealed chamber is equalized.

2. An apparatus, for use in a fluid medium, which is activated at a first depth in the fluid medium due to the pressure of the medium at the first depth and then released at a second depth in the fluid medium due to the pressure at the second depth which is less than the pressure at the first depth, said apparatus comprising:
    (a) a rectangular housing having a longitudinal cylindrical chamber open at one end and closed at the other end, said chamber extending partially through said housing from one end of the housing, said housing having first and second openings on different sides of said housing, the first opening closer to the open end of the chamber than the second opening;
    (b) a rod having a lesser diameter and a greater diameter, said greater diameter less than the diameter of the cylindrical chamber of the housing, and said rod having in the greater diameter portion of the rod a first notch and an adjoining second notch which is closer to the middle of said rod, said first notch having a greater depth than the second notch, said rod located in the chamber of the housing such that the second notch of the rod is aligned with the first opening of the housing;
    (c) a spring, having an inside diameter greater than the diameter of the lesser diameter of the rod and an outside diameter less than the diameter of the cylindrical chamber of the housing, said spring located with one end in contact with the base of the cylindrical chamber of the housing and the other end engaging the rod at the division of the greater and lesser diameter of the rod, said spring when compressed and released capable of ejecting said rod from the chamber at the second depth, said spring being compressed by the movement of the rod further into the chamber as the apparatus sinks to the first depth;

(d) an O-ring around the body of the rod, located around the greater diameter of the rod between the second notch in the rod and the division of the greater and lesser diameter of the rod, such that the O-ring defines a sealed chamber, said sealed chamber venting as the rod moves out of the chamber and the O-ring passes the second opening of the housing, thus allowing the pressure to equalize and the spring to eject the rod;

(e) a ball bearing located partially in the second notch and partially in the first opening of the housing thereby engaging the rod and preventing movement of the rod out of the chamber while allowing the rod to move further into the chamber until the apparatus reaches the first depth;

(f) a leaf spring associated with said ball bearing, said ball bearing having a diameter greater than the depth of the second notch, and less than the depth of the first notch, so that when the apparatus reaches the first depth and the rod moves further into the chamber, the ball bearing can completely enter the first notch pushed by the leaf spring and thereby permitting disengagement of the rod from the housing;

(g) said leaf spring connected to the outside of the housing on the same side of the housing as the first opening, said leaf spring having attached to it a rivet which extends into the first opening in the housing, compelling the ball bearing toward the rod and into the second notch in the rod until the first depth is reached and then compelling the ball bearing into the first notch of the rod and further inhibiting the ball bearing from re-entering the first opening in the housing.

* * * * *